(12) United States Patent
Smole et al.

(10) Patent No.: US 11,477,461 B2
(45) Date of Patent: Oct. 18, 2022

(54) OPTIMIZED MULTIPASS ENCODING

(71) Applicant: BITMOVIN, INC., San Francisco, CA (US)

(72) Inventors: Martin Smole, Klagenfurt am Wörthersee (AT); Armin Trattnig, Klagenfurt am Wörthersee (AT); Christian Feldmann, Aachen (DE)

(73) Assignee: BITMOVIN, INC., San Francisco, CA (US)

( * ) Notice: Subject to any disclaimer, the term of this patent is extended or adjusted under 35 U.S.C. 154(b) by 0 days.

(21) Appl. No.: 17/192,514

(22) Filed: Mar. 4, 2021

(65) Prior Publication Data

US 2021/0266572 A1   Aug. 26, 2021

Related U.S. Application Data

(63) Continuation of application No. 16/370,068, filed on Mar. 29, 2019, now Pat. No. 10,965,945.

(51) Int. Cl.
*H04N 19/179* (2014.01)
*H04N 19/136* (2014.01)
*H04N 19/176* (2014.01)
*G06N 20/00* (2019.01)
*G06N 3/08* (2006.01)

(52) U.S. Cl.
CPC ............ *H04N 19/179* (2014.11); *G06N 3/08* (2013.01); *G06N 20/00* (2019.01); *H04N 19/136* (2014.11); *H04N 19/176* (2014.11)

(58) Field of Classification Search
CPC .. H04N 19/132; H04N 19/136; H04N 19/179; H04N 19/176
See application file for complete search history.

(56) References Cited

U.S. PATENT DOCUMENTS

| | | | | |
|---|---|---|---|---|
| 10,499,081 B1* | 12/2019 | Wang | ................... | H04N 19/436 |
| 2010/0189183 A1* | 7/2010 | Gu | ....................... | H04N 19/177 |
| | | | | 375/240.28 |
| 2011/0305273 A1* | 12/2011 | He | ....................... | H04N 19/436 |
| | | | | 375/240.02 |
| 2012/0147958 A1 | 6/2012 | Ronca | | |

(Continued)

*Primary Examiner* — Rowina J Cattungal
(74) *Attorney, Agent, or Firm* — Marton Ribera Schumann & Chang LLP; Chien-Ju Alice Chuang; Hector J. Ribera

(57) ABSTRACT

An original input video file is encoded using a machine learning approach. The encoder performs a detailed video analysis and selection of encoding parameters that using a machine learning algorithm improves over time. The encoding process is done using a multi-pass approach. During a first pass, the entire video file is scanned to extract video property information that does not require in-depth analyses. The extracted data is then entered into an encoding engine, which uses artificial intelligence to produce optimized encoder settings. The video file is into a set of time-based chunks and, in a second pass, the encoding parameters for each chunk are set and distributed to encoding nodes for parallel processing. These encoder instances probe-encode each chunk determine the level of complexity for the chunk and to derive chunk-specific encoding parameters. Following completion of the second pass, the results of both passes are then merged to obtain the necessary information for the encoder to achieve the best possible result.

17 Claims, 4 Drawing Sheets

(56) References Cited

U.S. PATENT DOCUMENTS

| | | | |
|---|---|---|---|
| 2013/0089142 A1* | 4/2013 | Begen | H04N 21/26258 |
| | | | 375/240.12 |
| 2013/0282917 A1* | 10/2013 | Reznik | H04L 65/602 |
| | | | 709/231 |
| 2016/0073106 A1 | 3/2016 | Su | |
| 2016/0134881 A1 | 5/2016 | Wang | |
| 2017/0078686 A1* | 3/2017 | Coward | H04N 19/90 |
| 2018/0338146 A1* | 11/2018 | John | H04N 19/11 |
| 2019/0028745 A1 | 1/2019 | Katsavounidis | |
| 2019/0075301 A1* | 3/2019 | Chou | H04N 19/132 |
| 2020/0412784 A1* | 12/2020 | Yamagishi | H04L 67/141 |

\* cited by examiner

OPTIMIZED MULTIPASS ENCODING

CROSS-REFERENCE TO RELATED APPLICATIONS

This application is a continuation of U.S. patent application Ser. No. 16/370,068 titled "Optimized Multipass Encoding," filed Mar. 29, 2019, which is incorporated herein by reference in its entirety.

BACKGROUND

This disclosure generally relates to encoding of video or other media, and more particularly to the encoding of video titles using a customized multi-pass approach.

Due to the increasing availability of mobile high-speed Internet connections like WLAN/3G/4G/5G and the huge smartphone and tablet device boom in the recent years, mobile video streaming has become an important aspect of modern life. Online video portals like YouTube or Netflix deploy progressive download or adaptive video on demand systems and count millions of users watching their content every day. Real-time entertainment produces already nearly 50% of the U.S. peak traffic nowadays. This volume is expected to increase as the distribution of content worldwide moves to streaming platforms and stream size increases with additional audio-visual quality features, e.g., HDR, Atmos, etc., and with higher and higher resolutions, transitioning from 1080p to 4K, 8K, and future developed resolution standards. Moreover, particularly for mobile environments, adaptive streaming is required to cope with the considerable high fluctuations in available bandwidth. The video stream has to adapt to the varying bandwidth capabilities in order to deliver the user a continuous video stream without stalls at the best possible quality for the moment, which is achieved, for example, by dynamic adaptive streaming over HTTP.

In this context, adaptive streaming technologies, such as the ISO/IEC MPEG standard Dynamic Adaptive Streaming over HTTP (DASH), Microsoft's Smooth Streaming, Adobe's HTTP Dynamic Streaming, and Apple Inc.'s HTTP Live Streaming, have received a lot of attention in the past few years. These streaming technologies require the generation of content of multiple encoding bitrates and varying quality to enable the dynamic switching between different version of a title with different bandwidth requirements to adapt to changing conditions in the network. Hence, it is important to provide easy content generation tools to developers to enable the user to encode and multiplex content in segmented and continuous file structures of differing qualities with the associated manifest files.

Existing encoder approaches allow users to quickly and efficiently generate content at multiple quality levels suitable for adapting streaming approaches. For example, a content generation tool for DASH video on demand content has been developed by Bitmovin, Inc. (San Francisco, Calif.), and it allows users to generate content for a given video title without the need to encode and multiplex each quality level of the final DASH content separately. The encoder generates the desired representations (quality/bitrate levels), such as in fragmented MP4 files, and MPD file, based on a given configuration, such as for example via a RESTful API. Given the set of parameters the user has a wide range of possibilities for the content generation, including the variation of the segment size, bitrate, resolution, encoding settings, URL, etc. Using batch processing, multiple encodings can be automatically performed to produce a final DASH source fully automatically.

However, these prior encoding processes involve performing an in-depth analysis of the entire video before the encoding is started, to for example determine a "complexity bucket" into which the video would be categorized. Once a complexity is determined for the video file, the file is encoded according to the settings that have been determined to be optimal for that type of complexity. When the video file is encoded, a target bitrate and associated encoder settings is used throughout the file to encode the video. This approach provides a coarse customization of the encoding process for a given set of complexity buckets and the video files that are categorized into them. However, they do not provide a truly optimized encoding for the particular video title.

Thus, what is needed is an efficient encoding approach that provides an optimized encoding for a given title without significantly impacting the encoding performance.

SUMMARY

According to embodiments of the disclosure, a computer-implemented method and system for encoding an input video file is provided. The method includes analyzing the input video file to extract video parameters and determining optimized encoding parameters for the input video file based on the extracted video parameters and a set of learned relationships mapping video parameters to encoding parameters. The method also includes dividing the input video file into a plurality of time-based chunks of video content. Then, for each time-based chunk in the plurality of time-based chunks of video content, encoding parameters based on an analysis of characteristics of the video content in the time-based chunk are determined. The optimized encoding parameters for the video file are combined with the encoding parameters for each chunk in the plurality of time-based chunks of video content to derive a custom set of encoder settings for encoding the input video file. In embodiments, the custom set of encoder settings comprises encoding parameters for each time-based chunk that are tuned based on encoding parameters for other time-based chunks in the plurality of time-based chunks to produce a smooth transition between contiguous sections of encoded video content from contiguous time-based chunks in a resulting encoded video. The method also includes encoding the plurality of time-based chunks of video content based on the custom set of encoder settings to produce the resulting encoded video.

In some embodiments, quality metrics are obtained for the resulting encoded video and the set of learned relationships mapping video parameters to encoding parameters are updated based on the quality metrics. In other embodiments, the encoding the plurality of time-based chunks of video content may include encoding at least one time-based chunk of video content based on two different combinations of encoder settings in the custom set of encoder settings to produce at least two versions of the resulting encoded video. In these embodiments, the method can also include obtaining quality metrics for the at least two versions of the resulting encoded video and selecting a version of the resulting encoded video resulting in better quality metrics.

In embodiments, the method and system provide parallel processing, for example by distributing the plurality of time-based chunks of video content to a set of encoder nodes for determining encoding parameters based on an analysis of characteristics of the video content in the time-based chunk and then determining the encoding parameters by performing a probe encode of at least two time-based chunks at least two of the encoder nodes in parallel. In some embodiments, the encoding of the plurality of time-based chunks of video content based on the custom set of encoder settings to produce the resulting encoded video may be performed in the set of encoder nodes to provide parallel encoding of at least a subset of the time-based chunks.

In embodiments, a system for encoding an input video file includes a set of computing nodes, including one or more coordinator nodes, machine learning nodes, and encoder nodes. For example, in one embodiment a coordinator node is provided for analyzing the input video file to extract video parameters and for determining optimized encoding parameters for the input video file based on the extracted video parameters and a set of learned relationships mapping video parameters to encoding parameters. The coordinator node may be configured to divide the input video file into a plurality of time-based chunks of video content and to distribute the plurality of time-based chunks among a set of encoder nodes. The coordinator node may also be configured to combine the optimized encoding parameters for the video file with encoding parameters for the plurality of time-based chunks of video content to derive a custom set of encoder settings for encoding the input video file. The custom set of encoder settings may include encoding parameters for each time-based chunk that are tuned based on encoding parameters for other time-based chunks in the plurality of time-based chunks to produce a smooth transition between contiguous sections of encoded video content from contiguous time-based chunks in a resulting encoded video.

Machine learning nodes are provided for learning the relationships mapping video parameters to encoding parameters. The machine learning nodes are communicatively coupled to coordinator nodes. Further, encoder nodes, are provided that are configured to determine encoding parameters for a subset of the plurality of time-based chunks of video content based on an analysis of characteristics of the video content in the time-based chunk. The encoder nodes are further configured to receive the custom set of encoder settings to encode the subset of the plurality of time-based chunks based on the custom set of encoder settings to produce at least a portion of the resulting encoded video. These nodes may operate substantially in parallel to expedite the overall encoding process. In embodiments, the computing nodes are provided as part of a cloud-based encoding service.

Figure 1:
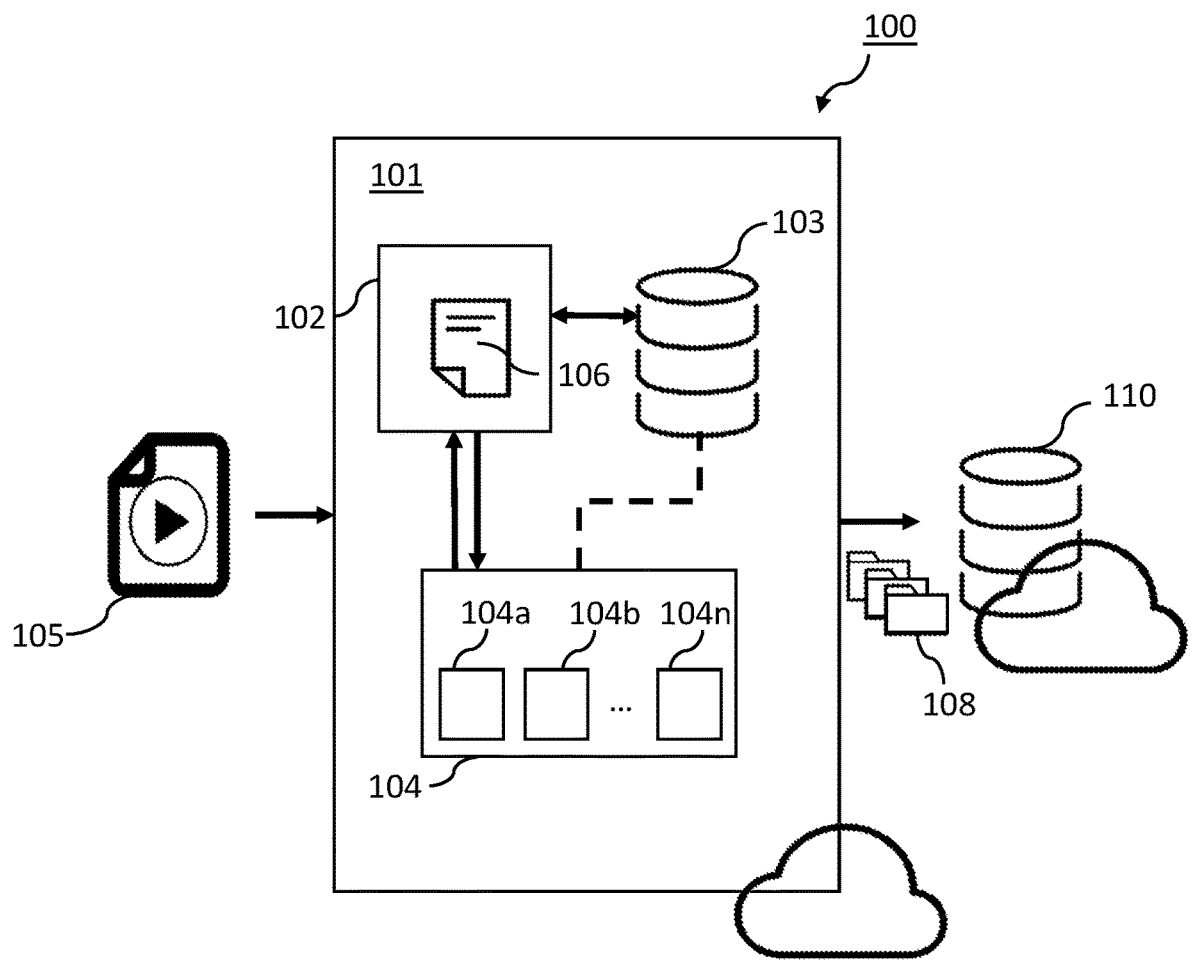
FIG. 1 is an illustrative diagram of an encoding system according to one embodiment.

The figures depict various example embodiments of the present disclosure for purposes of illustration only. One of ordinary skill in the art will readily recognize from the following discussion that other example embodiments based on alternative structures and methods may be implemented without departing from the principles of this disclosure and which are encompassed within the scope of this disclosure.

DESCRIPTION OF EMBODIMENTS OF THE INVENTION

The following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments.

The above and other needs are met by the disclosed methods, a non-transitory computer-readable storage medium storing executable code, and systems for encoding video content.

To address the problems identified above, in one embodiment, an original input video file is encoded using a machine learning approach. In this embodiment, the encoder can make smart decisions about compression settings and visual parameters of each frame, speeding up processing and improving encoding efficiency. In one embodiment, the encoder performs a detailed video analysis and selection of encoding parameters that using a machine learning algorithm improves over time. The encoding algorithm is continuously optimized to determine an optimal set of encoding parameters for a set of video characteristics. In contrast to conventional approaches, according to embodiments, the encoding process is done using a multi-pass approach.

During a first pass, the entire video file is scanned to extract video property information that does not require in-depth analyses (e.g., motion predictions). The extracted data is then entered into an encoding engine, which uses artificial intelligence to produce optimized encoder settings. Those settings are tuned to content information such as a broad estimate of content complexity, which is easily obtainable and provides an initial level of optimization. According to one embodiment, using machine learning, the system improves progressively, as it obtains more and more information from encoding different input files and building connections between learned video characteristics and corresponding encoder settings that deliver high quality video outputs. In embodiments, the encoding process includes a feedback path that checks the output video against objective or subjective quality metrics. Based on the quality metrics, the results are entered into the artificial intelligence engine to learn the impact of the selected settings for the input video characteristics. As the AI's database of encoding settings and accompanying results keeps growing, so does the quality of the matching encoding parameters and file attributes.

According to embodiments, after breaking up the input video file into a set of time-based chunks, in a second pass, the encoding parameters for each chunk are set and distributed to encoding nodes for parallel processing. The video content chunks are distributed to different encoder processing instances. The goal for this distribution is to equally distribute workload among a cluster of servers to provide a high degree of parallel processing. These encoder instances probe-encode each chunk determine the level of complexity for the chunk and to derive chunk-specific encoding parameters. Following completion of the second pass, the results of both passes are then merged to obtain the necessary information for the encoder to achieve the best possible result.

According to embodiments, other passes of the chunks may further fine-tune the parameters based on quality metrics and feedback. Once the encoding parameters are selected, the last pass performs the actual encoding process. The encoding process, which may also be done by the encoder instances on the video chunks in a parallel fashion, uses the data gained from the analyses in the first two passes to make encoding decisions, eventually resulting in an optimum quality output video at maximum bandwidth efficiency.

Now referring to FIG. 1, a content encoding system is illustrated according to embodiments of the invention. In one embodiment, the encoding system 100 is a cloud-based encoding system available via computer networks, such as the Internet, a virtual private network, or the like. The encoding system 100 and any of its components may be hosted by a third party or kept within the premises of an encoding enterprise, such as a publisher, video streaming service, or the like. The encoding system 100 may be a distributed system but may also be implemented in a single server system, multi-core server system, virtual server system, multi-blade system, data center, or the like. The encoding system 100 and its components may be implemented in hardware and software in any desired combination within the scope of the various embodiments described herein.

According to one embodiment, the encoding system 100 includes an encoder service 101. The encoder service 101 supports various input (HTTP, FTP, AWS-S3, GCS, Aspera, Akamai NetStorage, etc.) and output formats and multiple codecs (H264, H265, VP9, AV1, AAC, etc.) for VoD and live streaming. It also supports streaming protocols like MPEG-DASH and HLS and may be integrated with Digital Rights Managers (DRMs) like Widevine, Playready, Marlin, PrimeTime, Fairplay, and the like. According to embodiments, the encoder service 101 is a multi-cloud service capable of dynamically scaling with generation of processing nodes to support the workload. In one embodiment, for a particular encoding process, the encoder service 101 can generate an encoder coordinator node 102 supported by a machine learning module 103 and one or more encoder nodes 104.

According to embodiments, encoder nodes 104 can instantiate any number of encoder instances or submodules 104a, 104b, . . . , 104n, each capable of encoding an input video into an encoding format. The encoder node 104 performs the encodings, connecting inputs to outputs, applying codec configurations and filters on the input video files. The encoders can apply different and multiple muxings on streams like MPEG2-TS, fragmented MP4 and progressive MP4 and add DRM to the content and/or encrypted it as needed. Encoder node 104 can also extract and embed captions and subtitles, e.g., 608/708, WebVTT, SRT, etc.

For example, encoding submodule 104a may be an MPEG-DASH encoding submodule for encoding an input video 105 into a set of encoded media 108 according to the ISO/IEC MPEG standard for Dynamic Adaptive Streaming over HTTP (DASH). The encoding submodules 104b-104n may provide encoding of video for any number of formats, including without limitation Microsoft's Smooth Streaming, Adobe's HTTP Dynamic Streaming, and Apple Inc.'s HTTP Live Streaming. In addition, encoding submodules 104b-104n may use any type of codec for video encoding, including, for example, H.264/AVC, H.265/HEVC, VP8, VP9, AV1, and others. Any encoding standard or protocol may be supported by the encoder node 104 by providing a suitable encoding submodules with the software and/or hardware required to implement the desired encoding. In addition, in embodiments, encoder node 104 may be distributed in any number of servers in hardware, software, or a combination of the two, networked together and with the encoder coordinator node 102.

According to one aspect of embodiments of the invention, the encoder node 104 encodes an input video 105 at multiple bitrates with varying resolutions into a resulting encoded media 108. For example, in one embodiment, the encoded media 108 includes a set of fragmented MP4 files encoded according to the H.264 video encoding standard and a media presentation description ("MPD") file according to the MPEG-DASH specification. In an alternative embodiment, the encoding node 104 encodes a single input video 105 into multiple sets of encoded media 108 according to multiple encoding formats, such as MPEG-DASH and HLS for example. Input video 105 may include digital video files or streaming content from a video source, such as a camera, or other content generation system. According to embodiments, the encoder node 104 processes a video file in time-based chunks corresponding to portions of the input video file 105. Encoding submodules 104a-n process the video chunks for a given input video file substantially in parallel, providing a faster encoding process than serially processing the video file 105. The encoder node 104 is capable of generating output encoded in any number of formats as supported by its encoding submodules 104a-n.

According to another aspect of various embodiments, the encoder node 104 encodes the input video based on a given encoder configuration 106. The encoder configuration 106 can be received into the encoding server 101, via files, command line parameters provided by a user, via API calls, HTML commands, or the like. According to one embodiment, the encoder configuration 106 may be generated or modified by the encoder coordinator node 102 and/or the machine learning module 103. The encoder configuration 106 includes parameters for controlling the content generation, including the variation of the segment sizes, bitrates, resolutions, encoding settings, URL, etc. For example, according to one embodiment, the input configuration 106 includes a set of target resolutions desired for encoding a particular input video 105. In one embodiment, the target resolutions are provided as the pixel width desired for each output video and the height is determined automatically by keeping the same aspect ratio as the source. For example, the following pixel-width resolutions may be provided 384, 512, 640, 768, 1024, 1280, 1600, 1920, 2560, 3840. In this embodiment, the encoded output 108 includes one or more sets of corresponding videos encoding in one or more encoding formats for each specified resolution, namely, 384, 512, 640, 768, 1024, 1280, 1600, 1920, 2560, and 3840. In one embodiment, a set of fragmented MP4 files for each resolution is included in the encoded output 108. According to yet another aspect of various embodiments, the encoder configuration 106 is customized for the input video 105 to provide an optimal bitrate for each target resolution.

According to embodiments, the machine learning module 103 learns relationships between characteristics of input video files 105 and corresponding encoder configuration settings 106. In one embodiment, the machine learning module 103, interacts with the coordinator node 102 to determine optimized encoding parameters for the video file 105 based on extracted video parameters and learned relationships between video parameters and encoding parameters through training and learning from prior encoding operations. In embodiments, the machine learning module 103 receives output from quality check functions measuring objective parameters of quality from the output of the encoder instance submodules 104a-n. This output provides feedback from learning the impact of encoder parameters 106 on quality given a set of input video 105 characteristics. According to embodiments, the machine learning module 103 stores the learned relationships between input video characteristics and encoder settings using artificial intelligence, for example, in a neural network.

According to another aspect of various embodiments, the encoded output 108 is then delivered to storage 110. The encoding service 101 can connect to cloud-based storage as an output location to write the output files. The specific location/path may be configured for each specific encoding according to embodiments. For example, in one embodiment, storage 110 includes a content delivery network ("CDN") for making the encoded content 108 available via a network, such as the Internet. The delivery process may include a publication or release procedure, for example, allowing a publisher to check quality of the encoded content 108 before making available to the public. In another embodiment, the encoded output 108 may be delivered to storage 110 and be immediately available for streaming or download, for example, via a website.

Figure 2:
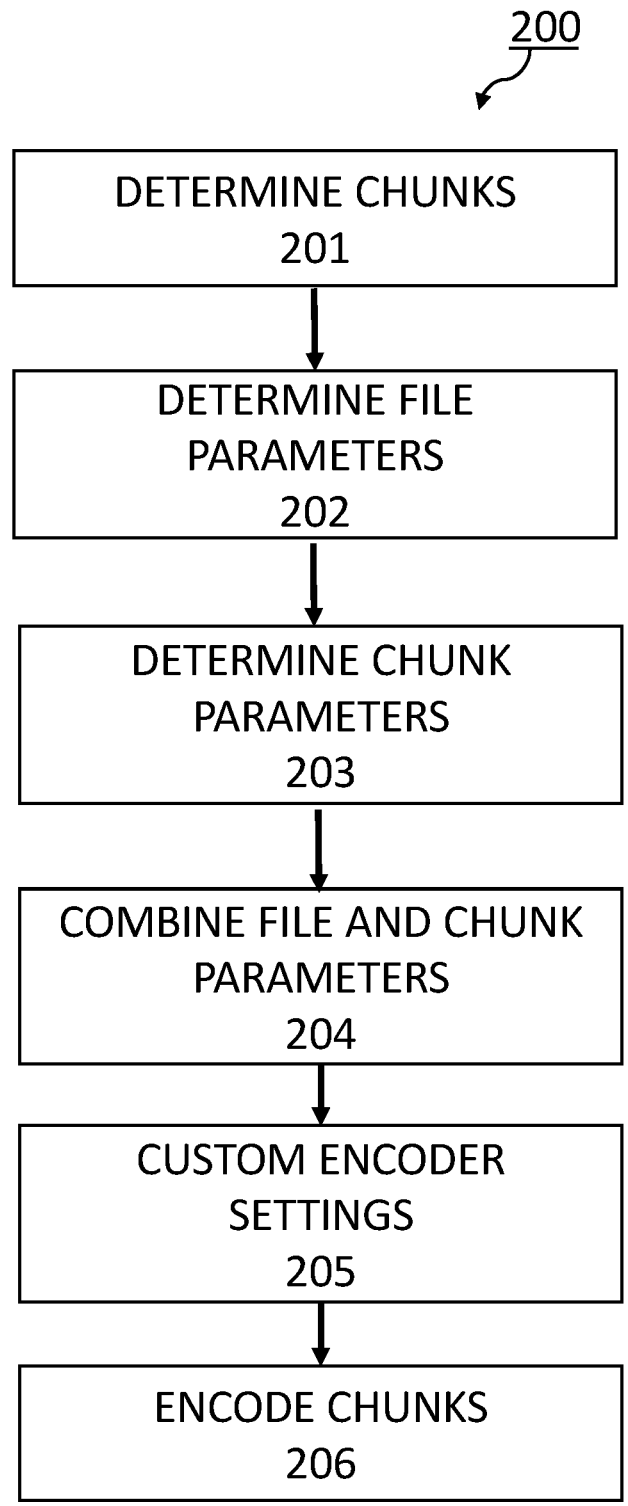
FIG. 2 is a flow chart illustrative of a method for encoding video content according to one embodiment.

Now referring to FIG. 2, an encoding process is provided according to various embodiments. According to one embodiment, the encoding process 200 determines a set of video content chunks 201. The process also performs a first pass through the input video file 105 to analyze its characteristics and determine 202 a set of file parameters to be used in the encoding process. In a second pass, the video content chunks are processed in a substantially parallel manner by, for example, encoder instance nodes 104a-n, performing probe encodes of the chunk at different time locations to analyze the complexity and extract other characteristics or properties of the video in the chunk and determine 203 encoder parameters applicable to each chunk. The file parameters are then combined 204 with the chunk parameters, applying overall limits, transition values for encoding rates, filters, and the like, to arrive at a set of customer encoder settings 205 for each chunk to be encoded. The custom settings are then distributed to the encoder instances for parallel encoding 206 the chunks to produce the encoded video output 108.

According to embodiments, each video chunk corresponds to a time slice of the overall input video file 105. The chunk determination step 201 may be performed at any time before determining the chunk parameters 203. In some embodiments, the input video file 105 is segmented or divided up into time-based clips or chunks that may overlap in time. For example, if the input video file 105 is encoded according to an MPEG standard, the location of non-referential frames, e.g., iFrames, may impose limitations regarding where each chunk begins and/or ends. The described approach works on chunks of any size. Smaller chunk sizes may have some benefits as they allow better parallelization of the processing, but they also require more fine-granular put settings per chunk. The optimal chunk size depends on desired size of files for subsequent processing and on the type of content. For example, fast moving content, like action movies, may benefit from smaller chunk sizes while content with lower action scenes, without much motion and possibly higher compression, may benefit from longer chunks. In one embodiment, the target chunk size is variable and may be a user configurable setting.

According to embodiments, once a target chunk size is set, the pre-encoding process cuts the input video file 105 into chunks of approximately the set target chunk size. As noted above, in one embodiment, once the target chunk size is reached, the video file is not cut until a non-referential frame is reached. In some embodiments, the next chunk starts at the target chunk size from the previous chunk even if the actual cut location exceeds the target. In these embodiments, the video corresponding to the time in excess of the target chunk size is removed and discarded before finalizing the output 108. In these embodiments, ultimately all the chunks are of the same size. In alternative embodiments, the next chunk begins after the actual cut location, resulting in chunks of different sizes.

Referring back to FIG. 2, in embodiments, a first pass through the input video file 105 determines file parameters 202 applicable to the video content as a whole. In one embodiment, the first pass determines the context in which the actual encoding of each chunk will be performed. The file parameters provide this context in terms of the structure of the file and the changes between scenes or portions of the file. For example, in one embodiment, the file-level context provides a relative complexity of each chunk compared to other chunks. In embodiments, quality factors applicable to the overall video content are determined. For example, the noisiness of the video content, whether any filters should be applied, such as sharpening filters, deinterlace, denoise, unsharp, audio volume, or the like. With this file-level context, the overall appearance of the encoded output can be maintained. For example, context is used to determine a range of bitrates that each individual chunk should be encoded within. It also allows for smooth transitions for filters and rates between chunks.

In embodiments, the input video content inspection during this first pass provides a set of characteristics for the input video file 105 that is analyzed by a machine learning module to determine 202 appropriate encoder settings for the file. For example, in one embodiment, a neural network is used to map a set of input video content characteristics to a set of encoder settings. The input video content characteristics can include any number of quality factors, such as noisiness or peak signal-to-noise ratio ("PSNR"), video multimethod assessment fusion ("VMAF") parameters, structural similarity (SSIM) index, as well as other video features, such as motion-estimation parameters, scene-change detection parameters, audio compression, number of channels, or the like. In some embodiments, the input video content characteristics can include subjective quality factors, for example obtained from user feedback, reviews, studies, or the like. In embodiments, the input video characteristics are analyzed with machine learning to provide a set of encoder settings for the video file. The machine learning algorithms can be trained with any source of quality factors or a combination of them. As further described below, after an initial set of default encoder settings, the machine learning algorithm is provided feedback regarding the quality of the resulting video output. The machine learning module applies the quality results to modify the encoder settings, learning from the effects on the resulting quality.

In different embodiments, the video file parameters that result from the first pass can include quantizer step settings, target bit rates, including average rate and local maxima and minima for any chunk, target file size, motion compensation settings, maximum and minimum keyframe interval, rate-distortion optimization, psycho-visual optimization, adaptive quantization optimization, other filters to be applied, and the like, that would apply to the entire file.

Figure 3:
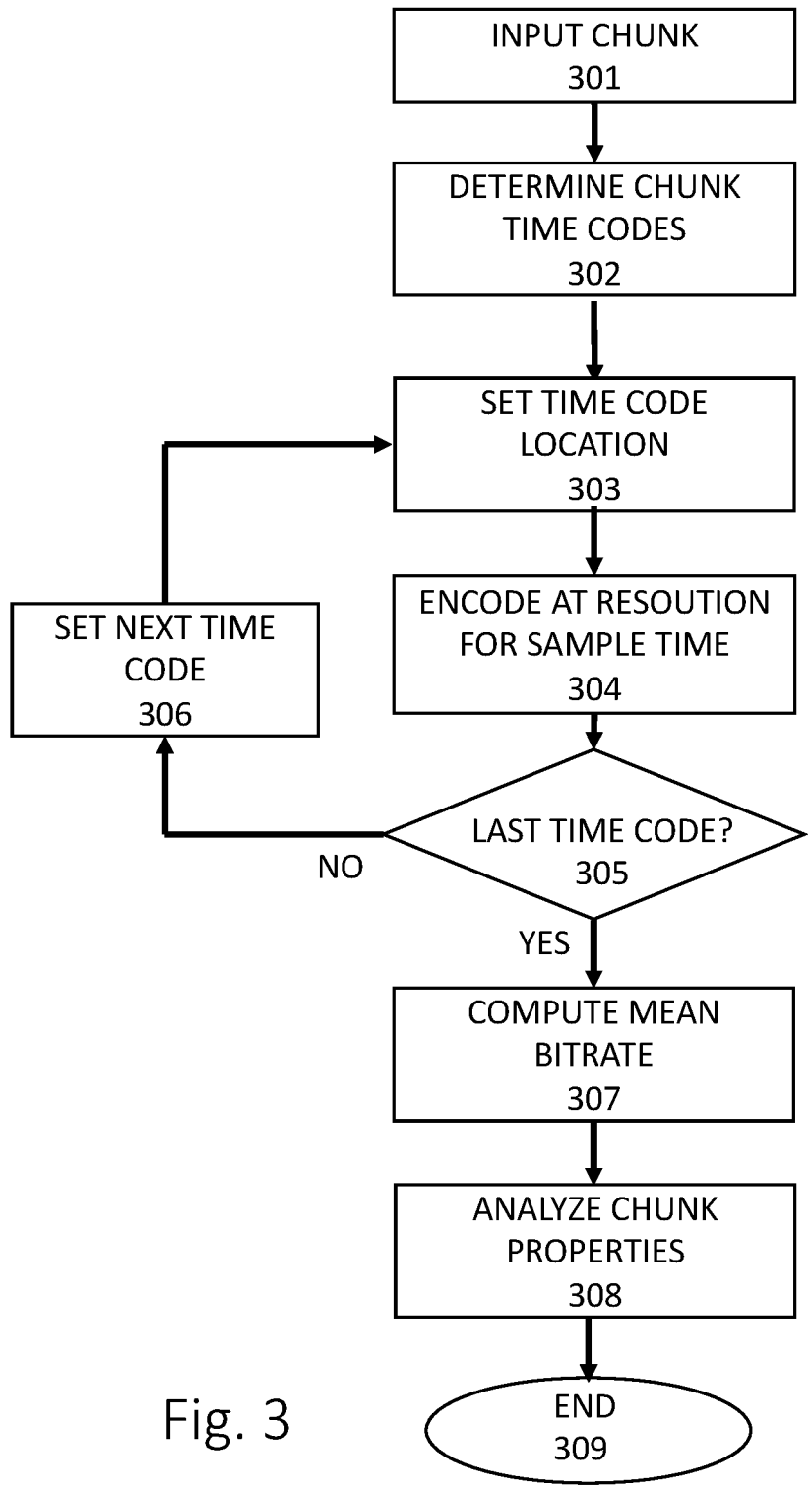
FIG. 3 is a flow chart illustrative of a method for analyzing video chunks according to one embodiment.

According to embodiments, the process also determines 203 chunk parameters that are specific to each video chunk. This step may be done simultaneously with the file parameters determination or sequentially and preferably the step is performed substantially at the same time for all or a subset of the determined video chunks. This approach beneficially speeds up the encoding process for a given input video file. To determine 203 the chunk parameters, each chunk is probe encoded to analyze the content. FIG. 3 illustrates the probe encoding process for a chunk. The probe encoding is a fast an efficient way to determine the bitrates that will be required to encode a given chunk at a given target resolution. For example, chunks with action content with rapidly changing, fast-moving, scenes will result in a higher average bitrate than a cartoon or a slower pace film with long segments from the same camera angle of a mostly stationary scene.

According to one embodiment, in a second pass, a chunk is input 301 for analysis and the probe encoding of the chunk involves determining 302 a set of time codes in the input video chunk. In one embodiment, the time codes are determined 302 based on configurable parameters, for example via input files, user input, or the like. In an alternative embodiment, the time codes are based on preconfigured parameters. For example, a number of time codes is one such parameter which may be preconfigured or may be part of the input configuration for the encoding process. In one embodiment, the number of time codes may be set based on the length of the chunks. For example, two to three time codes per chunk may be set. The number of time codes may be fully configurable in different embodiments. As the number of time codes increases, the performance of the probe encoding will decrease, all other parameters being equal, therefore there is a tradeoff between increasing the number of time codes and the time it will take to perform the probe encoding process.

According to one embodiment, once the time codes are determined 302, the input video chunk is accessed 303 at the location in the video input specified by the first time code. The video is then encoded 304 for the sample time specified. For example, 2 seconds, 10 seconds, 30 seconds, 1 minute, or the like. The longer the sample time, the longer it takes to perform the probe encode. In one embodiment, the probe encode process is done serially on each sample location and its duration is the sum of the sample encoding for each sample locations. In another embodiment, the probe encode process is done in parallel with a plurality of encoding nodes 104a-n. In this embodiment, the duration of the probe encode can be reduced to the encoding time for the longest encode from the encodings of all the samples. The probe encode delivers an average bitrate. The process then checks 305 to see if the current time code is the last time code of the chunk. In one embodiment, if the probe encodes are done serially, while the last time code is not reached, the time codes are increased and set 306 to the next time code. Then the process repeats (steps 303-305) to encode sample times for each time code in the chunk. In some embodiments, only one time code per chunk may be used.

The mean of the average bitrates for the encodings at the current resolution is computed 307 and recorded. According to embodiments, the probe encoding may be repeated for multiple target resolutions. If so, once the last target resolution is reached, the recorded mean bitrates for each resolution can be used to provide a custom bitrate table for each chunk. A process for generating custom bitrate tables is described in co-pending U.S. patent application Ser. No. 16/167,464, titled Video Encoding Based on Customized Bitrate Table, filed on Oct. 22, 2018, by Bitmovin, Inc., which is incorporated herein by reference in its entirety. The chunk is also analyzed 308 to derive other video characteristics or properties of the chunk, such as complexity, motion analysis factors, special compression, and the like. Then the probe encoding process ends 309.

Referring back to FIG. 2, according to one embodiment, the chunk parameter determination 203 performs a deep analysis of the chunk, for example based on the probe encoded process, and may be otherwise similar to the first pass of a conventional encoder. As the encoder node runs through the video chunk, a statistics file (".stats file") for the chunk is written saving the statistics for each frame in the chunk. According to one embodiment, during this process, the combination 204 of the file and chunk encoder parameters may begin at this step, where file parameter settings from the first pass are applied during this pass to generate the chunk statistics file, with information about quantizer and encoding rate for each frame to reach target bitrate.

Through the combination of the chunk encoder parameters and file encoder parameters, for example in the .stats file, a set of custom encoder settings for each chunk is generated 205. The custom encoder settings take into account file-wide features, such as overall quality, target bitrate, filters, etc. applied to each chunk to maintain the overall quality and look of the output, provide smooth transitions between contiguous chunks, and avoid sudden changes. For example, if the analysis of a chunk determined a maximum encoding bitrate that exceeded the maximum encoding bitrate determined for the file, the chunk bitrate would be reduced accordingly. Similarly, if two contiguous chunks resulted in disparate encoding bitrates, the file level parameters would provide for a smooth transition from one bitrate in the first chunk to the second bitrate in the next chunk. Similarly, filters required for one chunk may also cause contiguous chunks to begin the application of the filter, gradually increasing its effect to the desired filtering at the required location in the chunk. Through the combination 204 of file and chunk parameters, the custom encoder settings 205 define optimized encoding settings and pre- as well as post-processing steps on a per-chunk basis.

These custom encoder settings, including the chunk .stats files, are applied in parallel during a third pass to encode the chunks 206 and produce the final encoded output 108.

Figure 4:
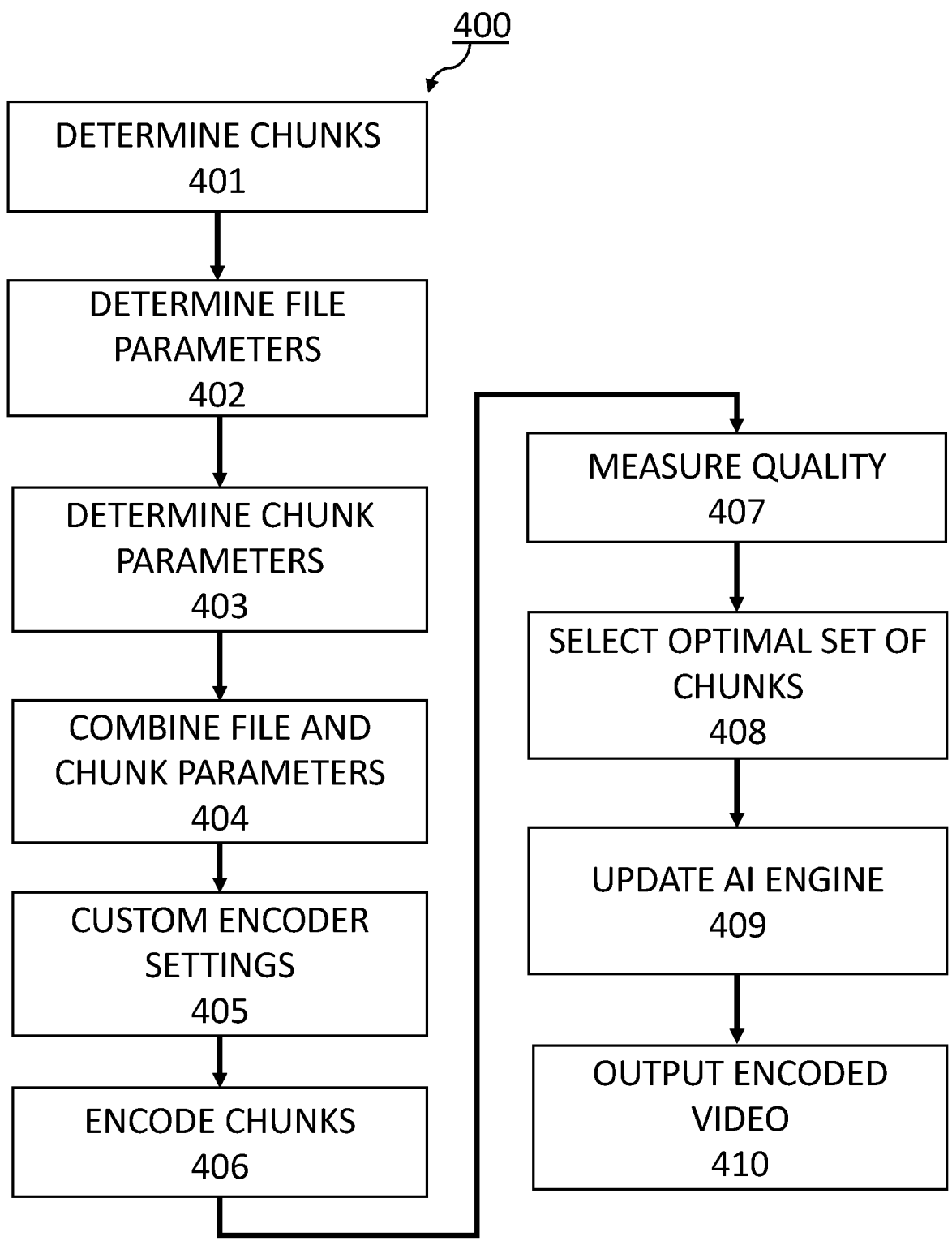
FIG. 4 is a flow chart illustrative of a method for encoding video content with machine learning feedback according to another embodiment.

Now referring to FIG. 4, an encoding process is provided according to various embodiments. According to one embodiment, the encoding process 400 operates in similar manner as that of FIG. 3. The process 400 determines a set of video content chunks 401. The process also performs a first pass through the input video file 105 to analyze its characteristics and determine 402 sets of file parameters to be used in the encoding process. In a second pass, the video content chunks are processed in a substantially parallel manner by, for example, encoder instance nodes 104a-n, performing probe encodes of the chunk at different time locations to analyze the complexity and extract other properties of the video in the chunk and determine 403 encoder parameters applicable to each chunk. The file parameters are then combined 404 with the chunk parameters, applying overall limits, transition values for encoding rates, filters, and the like, to arrive at a set of custom encoder settings 405 for each chunk to be encoded. The custom settings are then distributed to the encoder instances for parallel encoding 406 the chunks to produce the encoded video output 108.

According to embodiments, the process 400 then measures 407 the quality of the video in the resulting encoded output. The process 400 may be repeated multiple times with any number of passes, with steps 402-407 applied to the same chunks with varying parameters and varying custom encoder settings. Based on the quality measures, the optimal set of chunks are selected 408 for output and the artificial intelligence module is updated with the feedback-based learning provided by this process, increasing the relevance of parameters that contribute to higher quality output and decreasing the relevance of parameters that decrease the quality. For example, a neural network may adjust its predictions based on the quality metrics. This process 400 may be used for training the machine learning module, developing relationships between input video characteristics and parameters based on quality metrics of the resulting encoded video.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for encoding an input video file, the method comprising:
   in a first pass through the input video files, extracting video characteristics from the input video file as a whole;
   determining a file parameter for the input video file based on the extracted video characteristics and a set of learned relationships mapping video characteristics to encoding parameters;
   in a second pass through the input video file, performing a plurality of probe encodes in a substantially parallel manner on a plurality of video content chunks from the input video file, the plurality of probe encodes configured to extract an additional characteristic from each of the plurality of video content chunks, the probe encodes comprising;
      determining a chunk encoder parameter applicable to each of the plurality of video content chunks,
      deriving a set of custom encoder settings for each of the plurality of video content chunks based on the chunk encoder parameter from the second pass and the file parameter from the first pass, and
      probe encoding the plurality of video content chunks based on the set of custom encoder settings to generate an encoded video output for each of the plurality of video content chunks;
   measuring a quality of the encoded video output;
   selecting an optimal set of chunks from the plurality of video content chunks based on the quality; and
   updating an artificial intelligence module with feedback based on a relevance of one or both of the file parameter and the chunk encoder parameter to the quality.

2. The method of claim 1, wherein two or more of the plurality of probe encodes is performed at different time locations.

3. The method of claim 1, wherein the set of custom encoder settings is further based on a transition value for encoding rates.

4. The method of claim 1, wherein the set of custom encoder settings is further based on an overall limit.

5. The method of claim 1, wherein the encoding at least two or more of the plurality of video content chunks is performed in parallel in a plurality of encoder instances.

6. The method of claim 1, further comprising distributing the set of custom encoder settings to an encoder instance, wherein the encoding the plurality of video content chunks is performed in the encoder instance.

7. The method of claim 1, wherein the feedback comprises increasing the relevance when the quality corresponding to the one or both of the file parameter and the chunk encoder parameter is higher.

8. The method of claim 1, wherein the feedback comprises decreasing the relevance when the quality corresponding to the one or both of the file parameter and the chunk encoder parameter is lower.

9. The method of claim 1, wherein the artificial intelligence module comprises a neural network.

10. The method of claim 1, wherein training the artificial intelligence module results from quality metrics derived from repetition of the method to generate a plurality of feedback based on a plurality of quality measures of a plurality of encoded video outputs.

11. A computer-implemented method for encoding an input video file, the method comprising:
    learning, by a machine learning node, a set of learned relationships mapping a video characteristic to an encoding parameter from a plurality of extracted video characteristics for video files and corresponding encoding parameters from encoding operations performed by a plurality of encoder nodes, the machine learning node communicatively coupled to a coordinator node;
    extracting, by the coordinator node in a first pass through the input video file, a video characteristic from the input video file as a whole;

determining, by the coordinator node in the first pass, an optimized encoding parameter for the input video file based on the extracted video characteristics and the set of learned relationships;

dividing the input video file into a plurality of time-based chunks of video content in a second pass through the input video file;

for each time-based chunk of the plurality of time-based chunks of video content, determining an encoding parameter based on an analysis of characteristics of the video content;

deriving a set of custom encoder settings for each time-based chunk based on the encoding parameter from the second pass and the optimized encoding parameter from the first pass;

probe encoding the plurality of time-based chunks of video content based on the set of custom encoder settings to produce a resulting encoded video.

12. The method of claim 11, further comprising distributing the plurality of time-based chunks of video content to the plurality of encoder nodes, the plurality of encoder nodes configured to perform the probe encoding.

13. The method of claim 11, wherein the probe encoding is performed on at least two time-based chunks in parallel.

14. The method of claim 11, wherein the probe encoding comprises encoding at least one of the plurality of time-based chunks of video content on two different sets of custom encoder settings to produce at least two versions of the resulting encoded video.

15. The method of claim 11, wherein the plurality of encoder nodes are provided in a cloud-based encoding service.

16. The method of claim 11, further comprising receiving a quality metric based on the resulting encoded video.

17. The method of claim 16, further comprising updating the set of learned relationships based on the quality metric.

* * * * *